United States Patent
Kokubo et al.

(10) Patent No.: US 9,772,819 B2
(45) Date of Patent: Sep. 26, 2017

(54) APPARATUS AND METHOD FOR GENERATING PHYSICAL RANDOM NUMBERS

(71) Applicant: FUJITSU LIMITED, Kawasaki-shi, Kanagawa (JP)

(72) Inventors: Hirotaka Kokubo, Minato (JP); Dai Yamamoto, Kawasaki (JP); Masahiko Takenaka, Kawasaki (JP); Kazuyoshi Furukawa, Kawasaki (JP); Tetsuya Izu, London (GB)

(73) Assignee: FUJITSU LIMITED, Kawasaki (JP)

( * ) Notice: Subject to any disclaimer, the term of this patent is extended or adjusted under 35 U.S.C. 154(b) by 295 days.

(21) Appl. No.: 14/543,008

(22) Filed: Nov. 17, 2014

(65) Prior Publication Data
US 2015/0149519 A1 May 28, 2015

(30) Foreign Application Priority Data
Nov. 22, 2013 (JP) .................................. 2013-242396

(51) Int. Cl.
*G06F 7/58* (2006.01)

(52) U.S. Cl.
CPC ............... *G06F 7/58* (2013.01); *G06F 7/588* (2013.01)

(58) Field of Classification Search
CPC .................................... G06F 7/58; G06F 7/588
See application file for complete search history.

(56) References Cited

U.S. PATENT DOCUMENTS

| 6,687,721 B1 * | 2/2004 | Wells ...................... G06F 7/582 708/250 |
| 2006/0067527 A1 * | 3/2006 | Urivskiy ................. G06F 7/588 380/46 |

(Continued)

FOREIGN PATENT DOCUMENTS

| JP | 08-512438 | 12/1996 |
| JP | 4527127 | 8/2010 |

(Continued)

OTHER PUBLICATIONS

Extended European Search Report dated Mar. 27, 2015 for corresponding European Patent Application No. 14193426.5, 7 pages.

(Continued)

*Primary Examiner* — Chuong D Ngo
(74) *Attorney, Agent, or Firm* — Fujitsu Patent Center

(57) ABSTRACT

An apparatus for generating physical random numbers includes a physical random number generator configured to generate physical random numbers, a test unit configured to perform a test process to check randomness of the physical random numbers, a minimum entropy estimating unit configured to estimate a minimum entropy based on statistical information generated as a byproduct of the test process, an entropy compressing unit configured to perform an entropy compression process using the physical random numbers as an input, and an entropy control unit configured to control based on the minimum entropy a number of bits of the physical random numbers input into the entropy compression process performed by the entropy compressing unit.

8 Claims, 11 Drawing Sheets

(56) References Cited

U.S. PATENT DOCUMENTS

| | | | |
|---|---|---|---|
| 2007/0067692 A1* | 3/2007 | Dichtl | G06F 7/582 |
| | | | 714/738 |
| 2007/0206856 A1 | 9/2007 | Matsuda et al. | |
| 2012/0123693 A1 | 5/2012 | Wilber | |
| 2013/0136255 A1* | 5/2013 | Brown | H04L 9/0869 |
| | | | 380/28 |
| 2014/0279813 A1* | 9/2014 | Vasyltsov | G06N 5/00 |
| | | | 706/52 |

FOREIGN PATENT DOCUMENTS

| | | |
|---|---|---|
| JP | 2011-530719 | 12/2011 |
| WO | 94-21055 | 9/1994 |
| WO | 2010-017320 | 2/2010 |

OTHER PUBLICATIONS

Bucci, M. et al., "Fully Digital Random Bit Generators for Cryptographic Applications", IEEE Transactions on Circuits and Systems I: Regular Papers, vol. 55, No. 3, Apr. 2008, pp. 861-875, XP011203121.

Bucci, M. et al., "Design of Testable Random Bit Generators", CHES 2005, vol. LNCS 3659, Aug. 29, 2005, pp. 147-156, XP047029403.

\* cited by examiner

FIG.8

| $C_{max}$ | MINIMUM ENTROPY | $C_{max}$ | MINIMUM ENTROPY |
|---|---|---|---|
| 32 | 0.635428 | 49 | 0.172324 |
| 33 | 0.600983 | 50 | 0.151839 |
| 34 | 0.567641 | 51 | 0.132035 |
| 35 | 0.535349 | 52 | 0.11292 |
| 36 | 0.504054 | 53 | 0.094509 |
| 37 | 0.473712 | 54 | 0.07683 |
| 38 | 0.444281 | 55 | 0.059916 |
| 39 | 0.415723 | 56 | 0.043822 |
| 40 | 0.388006 | 57 | 0.028622 |
| 41 | 0.361097 | 58 | 0.014426 |
| 42 | 0.33497 | 59 | 0.001399 |
| 43 | 0.309601 | 60 | 0 |
| 44 | 0.284968 | 61 | 0 |
| 45 | 0.261054 | 62 | 0 |
| 46 | 0.237842 | 63 | 0 |
| 47 | 0.215322 | 64 | 0 |
| 48 | 0.193484 | | |

FIG.10

| | PER-BIT ENTROPY OF RUNTIME RANDOM NUMBER SEQUENCE | | | | |
|---|---|---|---|---|---|
| | 0.25bit | 0.5bit | 0.508bit | 0.75bit | 1.00bit |
| RELATED ART | NG | 512cycles | | | |
| EMBODIMENT | 1040cycles | 520cycles | 512cycles | 348cycles | 260cycles |

APPARATUS AND METHOD FOR GENERATING PHYSICAL RANDOM NUMBERS

CROSS-REFERENCE TO RELATED APPLICATIONS

The present application is based upon and claims the benefit of priority from the prior Japanese Patent Application No. 2013-242396 filed on Nov. 22, 2013, with the Japanese Patent Office, the entire contents of which are incorporated herein by reference.

FIELD

The disclosures herein relate to an apparatus for generating a random number, a method of generating a random number, and a system for generating a random number.

BACKGROUND

Secret keys used in encryption systems are generally generated by use of random numbers. Random numbers are largely classified into pseudo random numbers and physical random numbers (i.e., true random numbers) according to the method of generation. Pseudo random numbers are a part of a numerical sequence generated by deterministic calculation. An initial value referred to as a seed is fed into a pseudo random number generation algorithm to generate a pseudo random number sequence. With the knowledge of the generation method (i.e., pseudo random number generation algorithm) and the seed, theoretically, one can predict pseudo random numbers. With the knowledge of the internal initial value (i.e., seed), it is possible to calculate pseudo random numbers in advance. Because of this, using random numbers alone as the mechanism to generate secret keys may undermine security.

Physical numbers are generated by utilizing a physical phenomenon that is intrinsically random such as thermal noise within a device. Such random numbers are not repeatable, and no one can predict. Such a secret key generation method ensures tight security.

A physical random number generator is susceptible to environmental variation such as changes in temperature and voltage. Randomness of generated random numbers is known to be degradable depending on the environment. Random numbers having low-degree randomness carries a risk of being easily predicted, and, thus, the use of such random numbers in their original state had better be avoided in secret key generation. It is preferable to input random numbers into a circuit for correcting the randomness of physical random numbers before using them in applications such as secret key generation that require security.

An entropy compressing apparatus may be used as a circuit for correcting the randomness of physical random numbers. An entropy compressing apparatus may compress the entropy of a random number sequence having a length of 10 bits in which the entropy of each single bit is 0.5 bit, for example, thereby generating a random number series having a length of 5 bits in which the entropy of each single bit is 1.0 bit. In this example, entropy compression serves to increase entropy per bit from 0.5 bit to 1.0 bit. In this example of entropy compression, the per-bit entropy of output random numbers is greater than the per-bit entropy of input random numbers. However, the total entropy of the output random numbers does not exceed the total entropy of the input random numbers. In the case of the highest efficiency, the total entropy of output random numbers of an entropy compressing apparatus is equal to the total entropy of input random numbers.

In the following, an example will be considered in which an N-bit random number sequence generated by a physical random number generator is input into an entropy compressing apparatus for entropy compression, and an L-bit random number sequence is output from the entropy compressing apparatus. A minimum entropy M of the random number sequence output from the physical random number generator is estimated. Based on the value of the minimum entropy M, a length N of a random number sequence input into the entropy compressing apparatus is determined. The lower the minimum entropy M, the longer the bit length of a random number sequence input into the entropy compressing apparatus (i.e., the larger the value of N) is required in order to generate a physical random number sequence having a bit length of L and having a desired entropy amount. N, i.e., the bit length of the input applied to the entropy compressing apparatus, is determined by the following formula, based on the minimum per-bit entropy M estimated at the time of manufacture, a per-bit entropy E required for a physical random number sequence produced as a final output, and the output length L.

$$N=EL/M \quad (1)$$

The input length N of the entropy compressing apparatus is a fixed value that is calculated at the time of manufacture. In the case that the entropy of a random number sequence generated by the physical random number generator exceeds the estimated minimum entropy M at the time of actual operations, the random number sequence input into the entropy compressing apparatus does not have to be N bits in length. Despite this fact, an N-bit random number sequence is always used as an input. Since the processing time of the entropy compressing apparatus is proportional to the input length N, the situations as described above means that a needless processing time is consumed in order to perform an unnecessary process.

Moreover, at the time of actual operations, the entropy of a random number sequence output from the physical random number generator may sometimes drop below the estimated minimum entropy M. Such a phenomenon may occur due to malicious cooling performed by using a cooling spray or the like against the physical random number generator, or may occur due to aging deterioration. In such a case, the entropy compressing apparatus cannot generate an output random number sequence having a bit length L and having a required entropy value based on the N-bit input random number sequence.

It is preferable to institute some control procedure to allow proper entropy compression to be performed even when the entropy of a random number sequence actually output from the physical random number generator has fluctuation. In so doing, a circuit size relating to the added control procedure had better be as small as possible because random numbers generated by entropy compression may sometimes be used in small, portable smart cards, encrypted communication for portable phones, or authentication of digital certificates. Further, the added control procedure for allowing proper entropy compression preferably do not lower the speed of processing for generating entropy-compressed random numbers to the extent that is possible.

[Patent Document 1] Japanese Patent No. 4527127
[Patent Document 2] Japanese Laid-open Patent Publication No. 8-512438

[Patent Document 3] Japanese National Publication of International Patent Application No. 2011-530719

SUMMARY

According to an aspect of the embodiment, an apparatus for generating physical random numbers includes a physical random number generator configured to generate physical random numbers, a test unit configured to perform a test process to check randomness of the physical random numbers, a minimum entropy estimating unit configured to estimate a minimum entropy based on statistical information generated as a byproduct of the test process, an entropy compressing unit configured to perform an entropy compression process using the physical random numbers as an input, and an entropy control unit configured to control based on the minimum entropy a number of bits of the physical random numbers input into the entropy compression process performed by the entropy compressing unit.

According to an aspect of the embodiment, a method for generating physical random numbers includes generating physical random numbers, performing a test process to check randomness of the physical random numbers, estimating a minimum entropy based on statistical information generated as a byproduct of the test process, accumulating the physical random numbers as many bits as a number determined based on the minimum entropy, and performing an entropy compression process using the accumulated physical random numbers as an input.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 8 is a drawing illustrating an example of a conversion table used in minimum entropy estimation;

FIG. 10 is a table illustrating an advantage regarding the processing speed of the entropy compressing apparatus illustrated in FIG. 4.

DESCRIPTION OF EMBODIMENTS

In the following, embodiments of the invention will be described with reference to the accompanying drawings. In these drawings, the same or corresponding elements are referred to by the same or corresponding numerals, and a description thereof will be omitted as appropriate.

Figure 1:
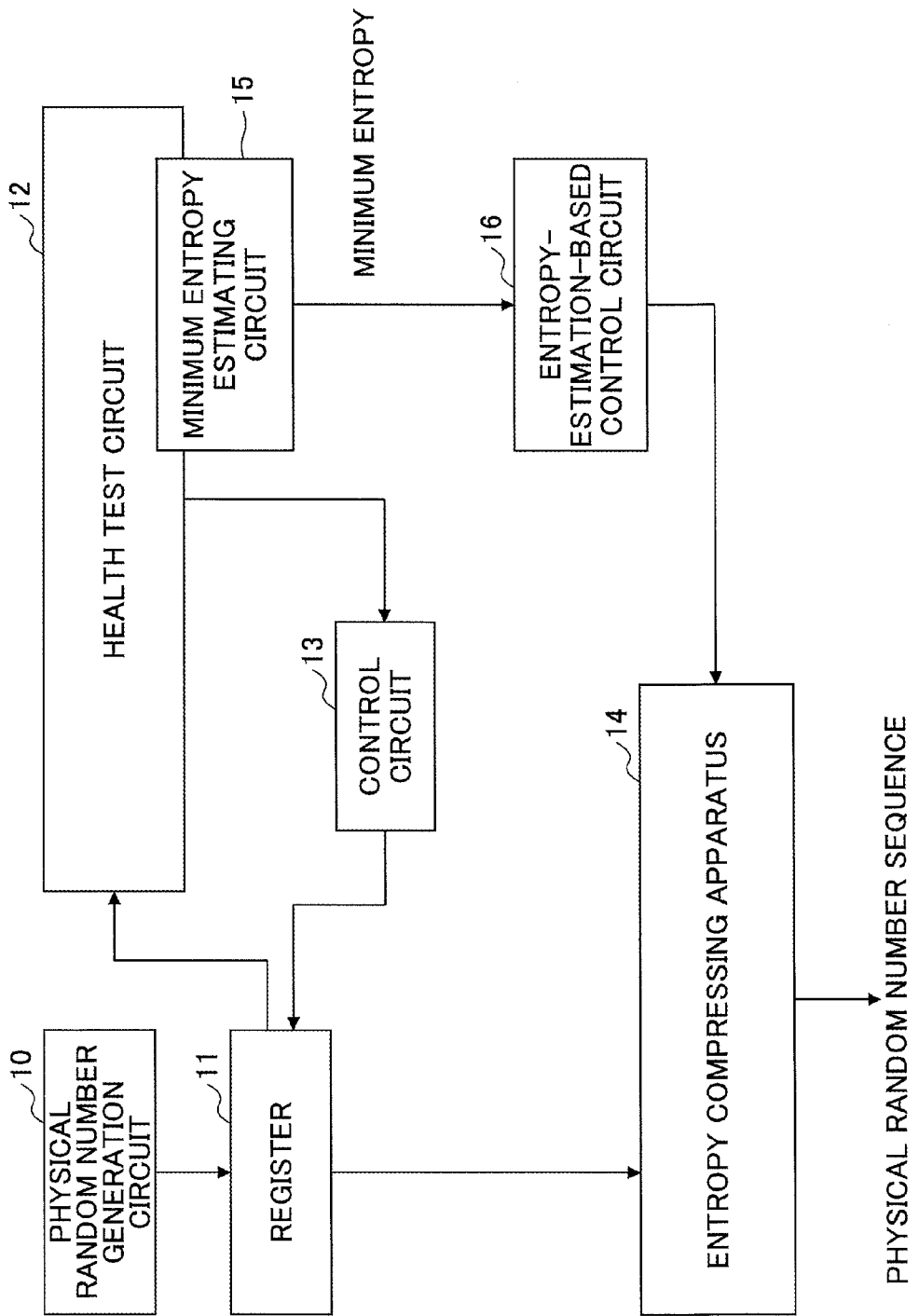
FIG. 1 is a drawing illustrating an example of the configuration of a physical random number generator apparatus.

FIG. 1 is a drawing illustrating an example of the configuration of a physical random number generator apparatus. The physical random number generator apparatus illustrated in FIG. 1 includes a physical random number generation circuit 10, a register 11, a health test circuit 12, a control circuit 13, an entropy compressing apparatus 14, a minimum entropy estimating circuit 15, and an entropy-estimation-based control circuit 16. In FIG. 1 and the subsequent similar drawings, boundaries between functional or circuit blocks illustrated as boxes basically indicate functional boundaries, and may not correspond to separation in terms of physical positions, separation in terms of electrical signals, separation in terms of control logic, etc. Each functional or circuit block may be a hardware module that is physically separated from other blocks to some extent, or may indicate a function in a hardware module in which this and other blocks are physically combined together.

The physical random number generation circuit 10 serves as a physical random number generating unit configured to generate physical random numbers. The physical random number generation circuit 10 generates physical random numbers one bit after another, and sends the generated physical random numbers to the register 11. The register 11 stores a predetermined number of bits of the physical random numbers supplied one bit after another.

The health test circuit 12 serves as a test unit configured to perform a test process that checks the randomness of the physical random numbers generated by the physical random number generation circuit 10. Specifically, the health test circuit 12 performs a test process for checking the randomness of a predetermined number of bits of the physical random numbers. In respect of a physical random number generator complying with SP800-90B defined by the National Institute of Standards and Technology in the United States, specific health tests are required to be performed. In the case of the results of the test process by the health test circuit 12 indicating satisfactory randomness, the control circuit 13 supplies the predetermined number of physical random numbers stored in the register 11 to the entropy compressing apparatus 14. In the case of the results of the test process by the health test circuit 12 failing to indicate satisfactory randomness, the control circuit 13 may discard the predetermined number of physical random numbers stored in the register 11 to the entropy compressing apparatus 14.

The minimum entropy estimating circuit 15 estimates a minimum entropy based on statistical information generated as a byproduct of the test process performed by the health test circuit 12. As far as the circuit configuration is concerned, the minimum entropy estimating circuit 15 and the health test circuit 12 share a processing portion that generates the above-noted statistical information. The sharing of the circuit portion between the minimum entropy estimating circuit 15 and the health test circuit 12 serves to suppress an increase in circuit size. Further, the acquisition of the statistical information is performed as part of the test process, and the subsequent minimum entropy estimation process is performed concurrently with the remaining test process, so that the lowering of total processing speed caused by the additional estimation of minimum entropy is suppressed to a minimum.

The entropy compressing apparatus 14 receives physical random numbers supplied from the register 11 as an input, and performs an entropy compression process. The entropyestimation-based control circuit 16 serves as an entropy control unit configured to control based on the minimum entropy the number of physical random numbers input into the entropy compression process performed by the entropy compressing apparatus 14. Specifically, the entropy-estimation-based control circuit 16 uses a relatively large number of input bits in the case of the minimum entropy being relatively small, and uses a relatively small number of input bits in the case of the minimum entropy being relatively large.

Figure 2:
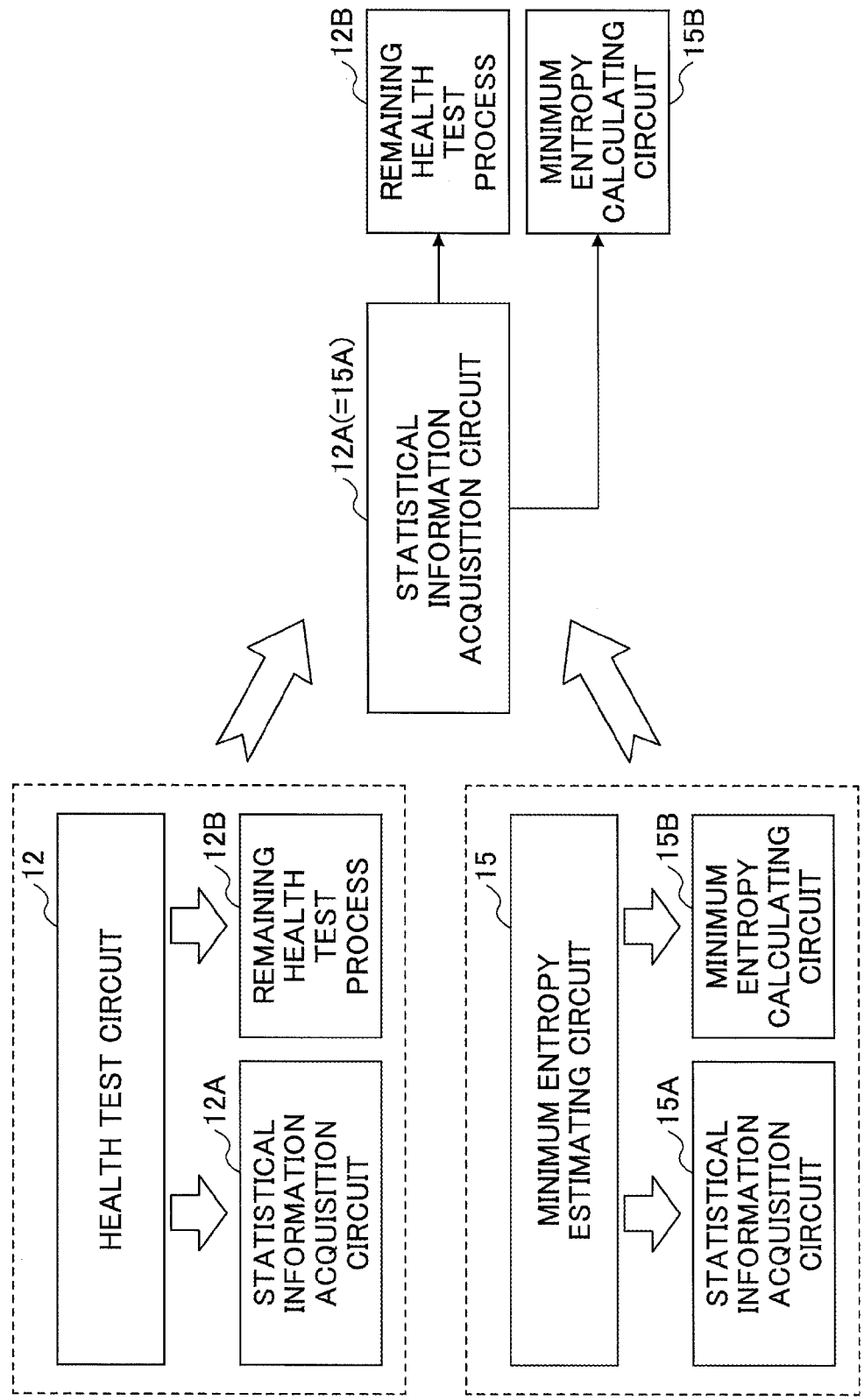
FIG. 2 is a drawing illustrating relationships between a minimum entropy estimating circuit and a health test circuit.

FIG. 2 is a drawing illustrating relationships between the minimum entropy estimating circuit and the health test circuit. As illustrated in FIG. 2, the health test circuit 12 may be divided into a statistical information acquisition circuit 12A and a remaining health test process 12B. Similarly, the minimum entropy estimating circuit 15 may be divided into a statistical information acquisition circuit 15A and a minimum entropy calculating circuit 15B. The statistical information acquisition process performed by the statistical information acquisition circuit 12A is the same as the statistical information acquisition process performed by the statistical information acquisition circuit 15A.

In the physical random number generator apparatus illustrated in FIG. 1, provision is made as illustrated in FIG. 2 such that the statistical information acquisition circuit 12A (which is functionally the same as the statistical information acquisition circuit 15A) is shared by the health test process and the minimum entropy estimation process. Namely, the remaining health test process 12B performs a health test process by use of the statistical information generated by the statistical information acquisition circuit 12A. Further, the minimum entropy calculating circuit 15B performs a minimum entropy calculating process (i.e., estimation process) by use of the statistical information generated by the statistical information acquisition circuit 12A.

Figure 3:
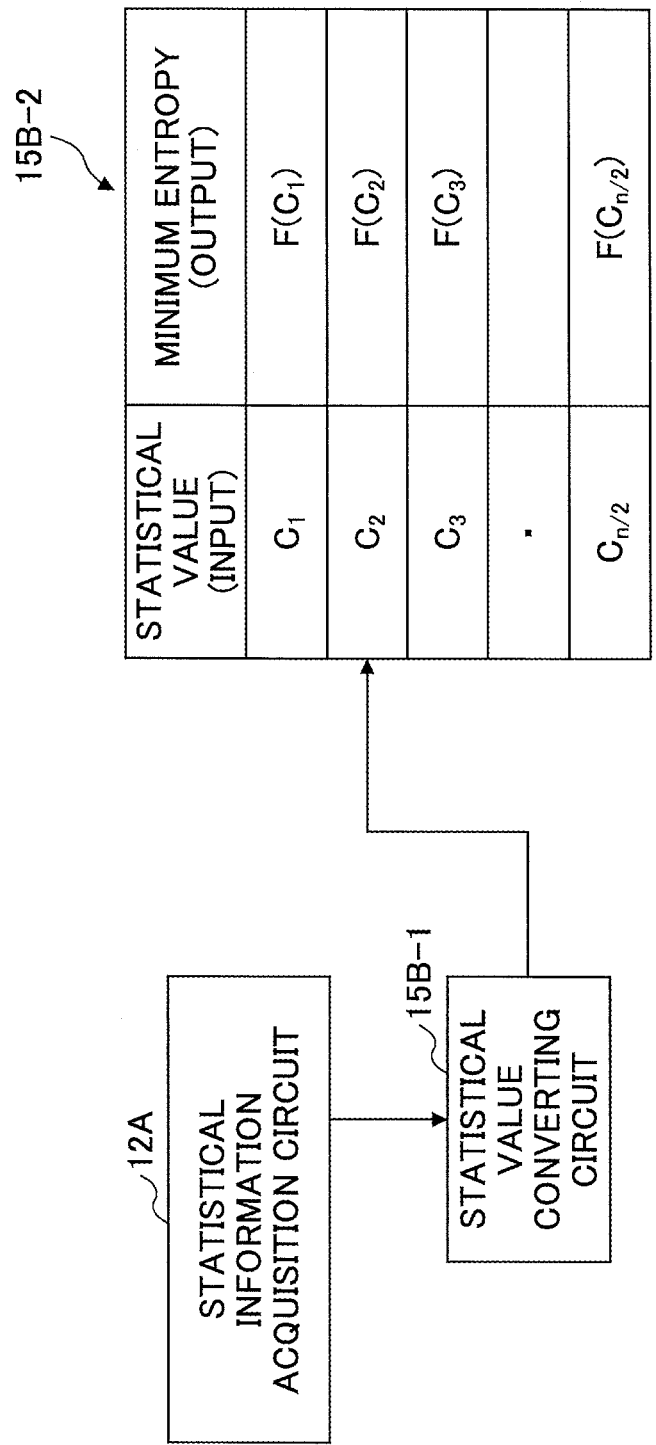
FIG. 3 is a drawing illustrating an example of the configuration of the minimum entropy estimating circuit.

FIG. 3 is a drawing illustrating an example of the configuration of the minimum entropy estimating circuit. The minimum entropy estimating circuit illustrated in FIG. 3 includes the statistical information acquisition circuit 12A, a statistical value converting circuit 15B-1 and a minimum entropy supply circuit 15B-2. The statistical information acquisition circuit 12A generates statistical information based on the predetermined number (i.e., n) of bits of physical random numbers. The statistical value converting circuit 15B-1 converts the statistical information generated by the statistical information acquisition circuit 12A into a value responsive to the statistical information. The minimum entropy supply circuit 15B-2 is a lookup table in which values $C_1$ through $C_{n/2}$ responsive to statistical information (i.e., statistical values illustrated in FIG. 3) are associated with estimated minimum entropy values $F(C_1)$ through $F(C_{n/2})$. A value responsive to the statistical information output from the statistical value converting circuit 15B-1 is supplied to the minimum entropy supply circuit 15B-2, so that an estimated minimum entropy value corresponding to the value responsive to the statistical information is retrieved from the lookup table as an output value. In this manner, a minimum entropy with respect to the predetermined number (i.e., n) of bits of the physical random numbers is estimated.

In the example of the configuration of the minimum entropy estimating circuit illustrated in FIG. 3, the portion that obtains a minimum entropy from a value responsive to statistical information is implemented as a lookup table. The use of a lookup table serves to achieve high speed processing with respect to minimum entropy estimation.

Figure 4:
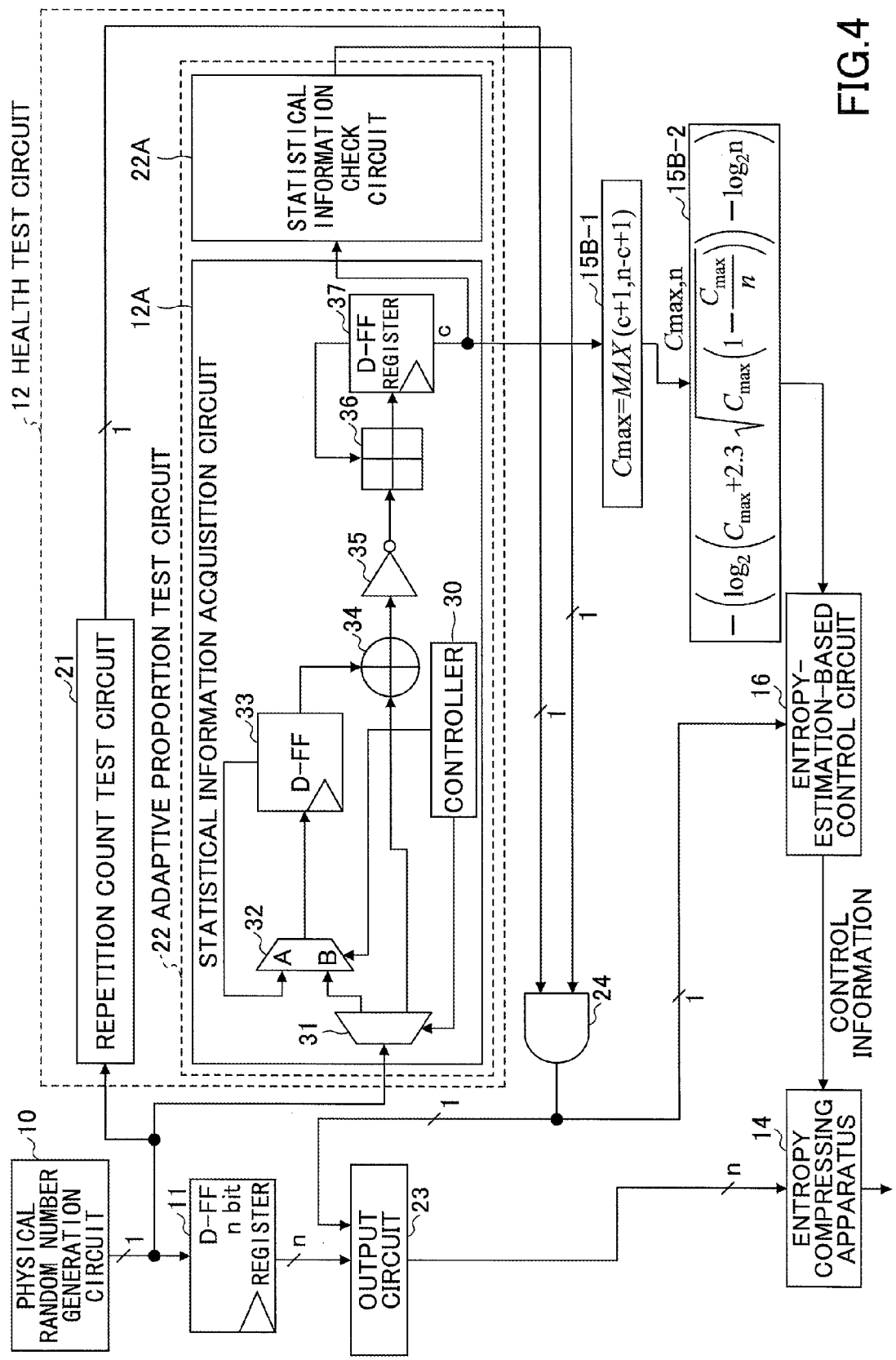
FIG. 4 is a drawing illustrating an example of the detailed configuration of the physical random number generator apparatus.

FIG. 4 is a drawing illustrating an example of the detailed configuration of the physical random number generator apparatus. The physical random number generator apparatus includes the physical random number generation circuit 10, the register 11, the health test circuit 12, the entropy compressing apparatus 14, the entropy-estimation-based control circuit 16, the statistical value converting circuit 15B-1, the minimum entropy supply circuit 15B-2, an output circuit 23, and an AND gate 24. The output circuit 23 and the AND gate 24 corresponds to the control circuit 13 illustrated in FIG. 1.

The health test circuit 12 includes a repetition count test circuit 21 and an adaptive proportion test circuit 22. A repetition count test performed by the repetition count test circuit 21 and an adaptive proportion test performed by the adaptive proportion test circuit 22 are defined in SP800-90B set forth by the National Institute of Standards and Technology in the United States.

The repetition count test checks whether numbers having the same value occur in a row beyond chance expectation. This test checks random numbers one bit after another, and the checked bit values fail to pass the test in the case of these values being the same value in more than a predetermined number of consecutive occurrences. The adaptive proportion test checks the presence of a local random number imbalance. With respect to 1+W bits of random numbers, the number of bits having the same value as the first bit is counted in the W subsequent bits. The checked bits fail to pass the test in the case of the counted number exceeding a predetermined count. The test results output from the repetition count test circuit 21 may assume a value of "1" upon passing the test, and may assume a value of "0" upon failing to pass the test.

The adaptive proportion test circuit 22 includes the statistical information acquisition circuit 12A and a statistical information check circuit 22A. The statistical information acquisition circuit 12A generates statistical information that is to be used in common by the adaptive proportion test and the minimum entropy estimation. This statistical information may be the number of subsequent bits having the same value as the first bit when the predetermined number of bits of physical random numbers are taken into consideration. The statistical information check circuit 22A may check whether this statistical information exhibits a value greater than a predetermined value, thereby producing a result indicative of pass or failure with respect to the adaptive proportion test. The test result output from the adaptive proportion test circuit 22 may assume a value of "1" upon passing the test, and may assume a value of "0" upon failing to pass the test.

The test result output from the repetition count test circuit 21 and the test result output from the adaptive proportion test circuit 22 are supplied to the AND gate 24. An event that both of the test results indicate a pass causes the output signal of the AND gate 24 to be asserted. In response to the assertion of the output signal of the AND gate 24, the output circuit 23 supplies to the entropy compressing apparatus 14 the predetermined number of bits (i.e., n bits: n is an integer larger than or equal to 2) of physical random numbers stored in the register 11.

In the following, the operation of the physical random number generator apparatus illustrated in FIG. 4 will be described. The physical random number generation circuit 10 generates 1 bit that is a physical random number. The 1-bit physical random number generated by the physical random number generation circuit 10 is supplied to the register 11, to the repetition count test circuit 21, and to the statistical information acquisition circuit 12A of the adaptive proportion test circuit 22.

The generation of a 1-bit physical random number by the physical random number generation circuit 10 is repeated n times, so that n bits of physical random numbers are stored in the register 11. The repetition count test circuit 21 performs a repetition count test on the physical random numbers supplied one bit after another, thereby producing a test result indicative of pass or failure with respect to the test. The statistical information acquisition circuit 12A of the adaptive proportion test circuit 22 produces statistical information c (which indicates the number of subsequent bits having the same value as the first bit) with respect to the n bits of physical random numbers generated by the physical random number generation circuit 10. The statistical information check circuit 22A performs the remaining portion of the adaptive proportion test based on the statistical information c to produce a signal indicative of the test result.

The statistical value converting circuit 15B-1 obtains as a statistical value the number of occurrences of "0" or the number of occurrences of "1", whichever is greater, in the n bits of physical random numbers based on the statistical information c and the predetermined number n. This is achieved by selecting a greater one of c+1 and n−c+1 and by outputting the selected one as a statistical value. The statistical value output from the statistical value converting circuit 15B-1 is denoted as Cmax. The minimum entropy supply circuit 15B-2 performs calculation illustrated in FIG. 4 to produce an estimated minimum entropy from the predetermined number n and the statistical value Cmax. The estimated minimum entropy is supplied to the entropy-estimation-based control circuit 16. The minimum entropy supply circuit 15B-2 may be implemented as a lookup table as described in connection with FIG. 3.

The AND gate 24 performs an AND operation between the test result of the repetition count test circuit 21 and the test result of the adaptive proportion test circuit 22, and supplies the result of the AND operation to the output circuit 23 and to the entropy-estimation-based control circuit 16. The output circuit 23 does not supply physical random numbers to the entropy compressing apparatus 14 in the case of at least one of the two test results indicating failure. The output circuit 23 supplies the n bits of physical random numbers stored in the register 11 to the entropy compressing apparatus 14 in the case of both of the test results indicating pass.

In the case of the output of the AND gate 24 being HIGH (i.e., both of the test results indicating pass), the entropy-estimation-based control circuit 16 controls the entropy compressing apparatus 14 in response to the minimum entropy supplied from the minimum entropy supply circuit 15B-2. Specifically, the entropy-estimation-based control circuit 16 controls based on the minimum entropy the number of physical random numbers input into the entropy compression process performed by the entropy compressing apparatus 14. In so doing, the entropy-estimation-based control circuit 16 uses a relatively large number of input bits in the case of the minimum entropy being relatively small, and uses a relatively small number of input bits in the case of the minimum entropy being relatively large. The control operations of the entropy-estimation-based control circuit 16 will be described later in detail.

Based on the input physical random numbers whose quantity in terms of the number of bits is controlled, the entropy compression process performed by the entropy compressing apparatus 14 produces a random number sequence constituted by a fixed number of bits regardless of how many input bits are supplied. Namely, a relatively large number of input bits are used in the case of the minimum entropy being relatively small, thereby securing an appropriate amount of entropy in an input random number sequence as a whole, followed by outputting a random number sequence of a fixed bit length having at least a desired amount of entropy. Further, a relatively small number of input bits are used in the case of the minimum entropy being relatively large, thereby reducing the time length required for entropy compression, followed by outputting a random number sequence of a fixed bit length having at least a desired amount of entropy.

Figure 5:
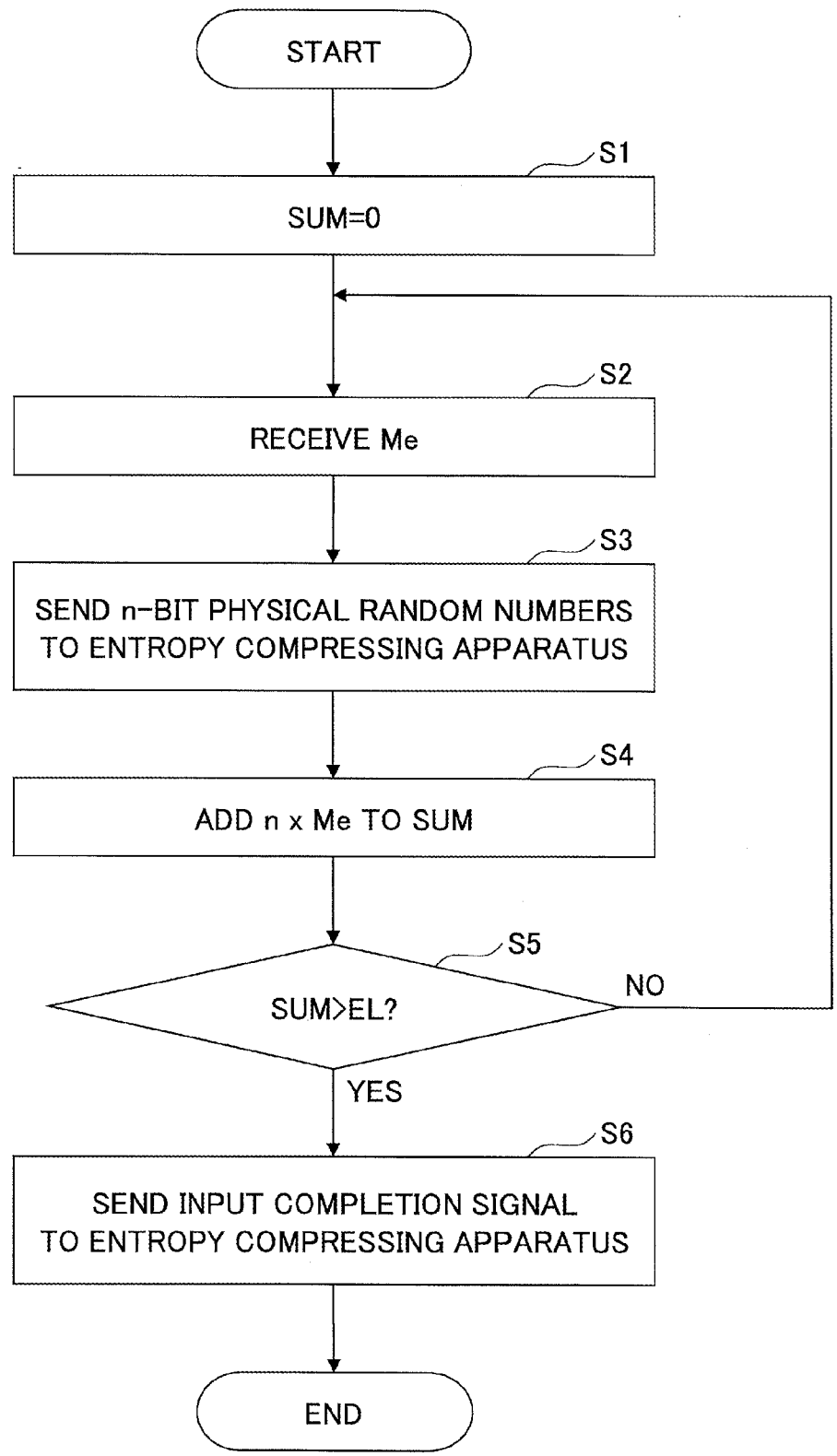
FIG. 5 is a flowchart illustrating an example of the operation of an entropy-estimation-based control circuit.

FIG. 5 is a flowchart illustrating an example of the operation of the entropy-estimation-based control circuit. In this procedure, a plurality of sets of random numbers are accumulated where one set is constituted by the predetermined number of bits (i.e., n bits) of physical random numbers. The entropy-estimation-based control circuit 16 uses the accumulated physical random numbers as an input into the entropy compression process when the sum of products between the predetermined number and the minimum entropy as added for the plurality of sets exceeds a predetermined entropy value. It may be noted that the flowchart illustrated in FIG. 5 does not take into account physical random numbers that have failed to pass the health test. Namely, only the n-bit physical random numbers having passed the health test and the minimum entropies corresponding thereto are used in the procedure of the flowchart illustrated in FIG. 5. The same applies in the case of the flowcharts illustrated in FIG. 6 and FIG. 7.

It may be noted that, in FIG. 5 and the subsequent flowcharts, an order in which the steps illustrated in the flowchart are performed is only an example. The scope of the disclosed technology is not limited to the disclosed order. For example, a description may explain that an A step is performed before a B step is performed. Despite such a description, it may be physically and logically possible to perform the B step before the A step while it is possible to perform the A step before the B step. In such a case, all the consequences that affect the outcomes of the flowchart may be the same regardless of which step is performed first. It then follows that, for the purposes of the disclosed technology, it is apparent that the B step can be performed before the A step is performed. Despite the explanation that the A step is performed before the B step, such a description is not intended to place the obvious case as described above outside the scope of the disclosed technology. Such an obvious case inevitably falls within the scope of the technology intended by this disclosure.

In the following, a per-bit entropy required of a physical random number sequence output from the entropy compressing apparatus 14 is denoted as E, and the length of this physical random number sequence is denoted as L (bits). In step S1, the entropy-estimation-based control circuit 16 initializes a variable SUM to zero. In step S2, the entropy-estimation-based control circuit 16 receives an estimated minimum entropy Me from the minimum entropy supply circuit 15B-2. In step S3, the output circuit 23 sends n-bit physical random numbers to the entropy compressing apparatus 14. The entropy compressing apparatus 14 stores the received n-bit physical random numbers in a latch or the like to accumulate them together with the physical random numbers previously received. Namely, in the case in which n-bit physical random numbers are received m times, the physical random numbers obtained through these m receptions are put together and stored as physical random numbers of m×n bits in the latch or the like.

In step S4, the entropy-estimation-based control circuit 16 adds n×Me to the variable SUM. In step S5, the entropyestimation-based control circuit 16 checks whether the value of the variable SUM is greater than E×L. If the check result indicates NO, the procedure goes back to step S2 to repeat the subsequent steps. If the check result indicates YES, the entropy-estimation-based control circuit 16 sends an input completion signal to the entropy compressing apparatus 14 in step S6.

In response to the input completion signal, the entropy compressing apparatus 14 performs an entropy compression process by using, as the input thereinto, all the bits of the physical random numbers received after step S1. The configuration and operations of the entropy compressing apparatus 14 will be described later in detail.

In the procedure described above, the value of the estimated minimum entropy Me is always regarded as reliable, and an optimum input length is calculated in accordance with the value of Me. In the case of the estimated minimum entropy Me assuming an appropriate value, high-speed entropy compression is achievable, producing a physical random number sequence having an entropy value larger than or equal to EL.

Figure 6:
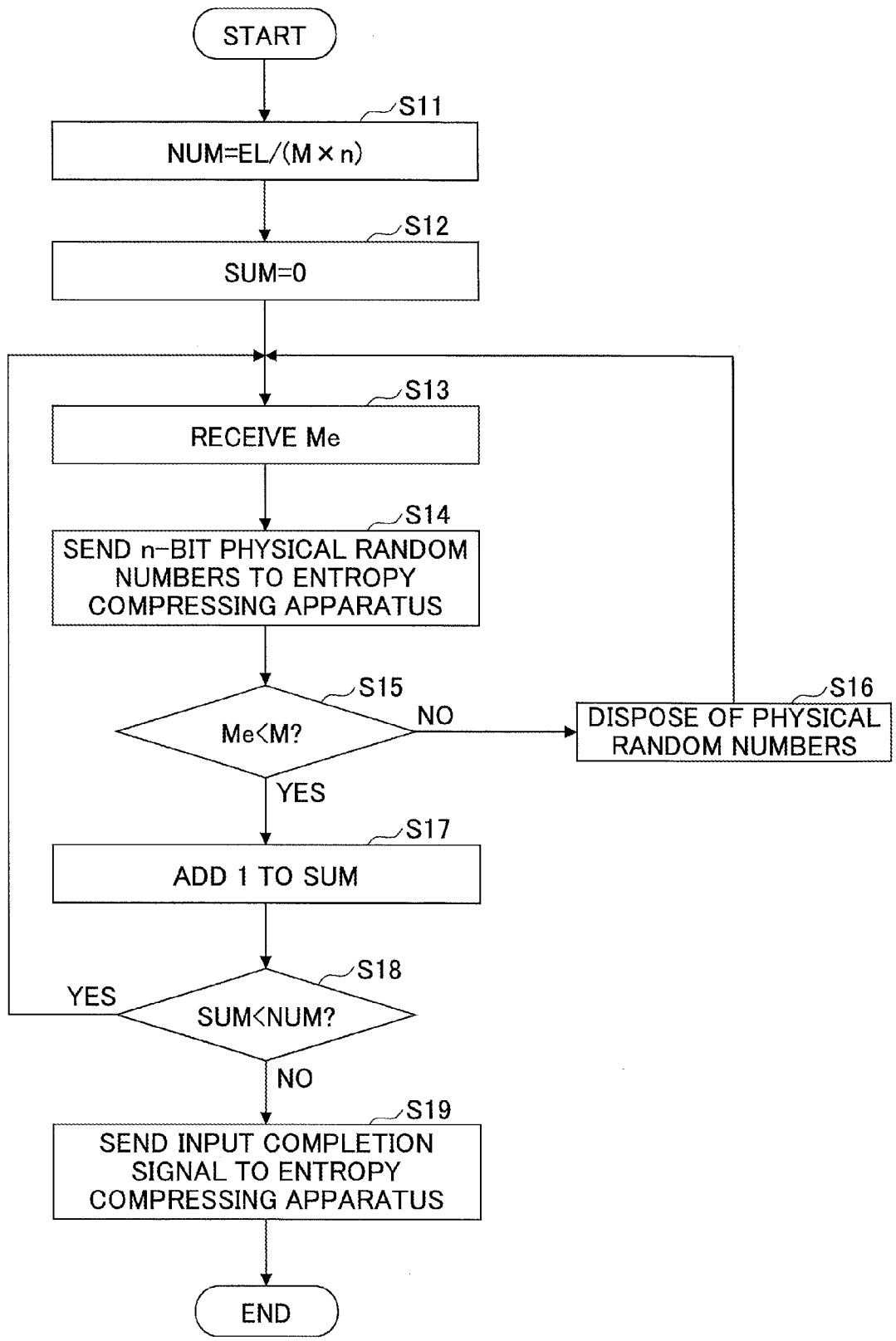
FIG. 6 is a flowchart illustrating another example of the operation of the entropy-estimation-based control circuit.

FIG. 6 is a flowchart illustrating another example of the operation of the entropy-estimation-based control circuit. In this procedure, a plurality of sets of random numbers having a minimum entropy larger than or equal to a predetermined value are accumulated where one set is constituted by the predetermined number of bits (i.e., n bits) of physical random numbers. The entropy-estimation-based control circuit 16 uses the accumulated physical random numbers as an input into an entropy compression process when the number of accumulated sets exceeds a predetermined value.

In the following, a per-bit entropy required of a physical random number sequence output from the entropy compressing apparatus 14 is denoted as E, and the length of this physical random number sequence is denoted as L (bits). A per-bit minimum entropy generated by the physical random number generation circuit 10 is denoted as M, which is determined by testing the physical random number generator apparatus at the time of manufacture.

In step S11, the value of a variable NUM is set equal to (E×L)/(M×n), and is stored in memory or the like. This value of the variable NUM may be calculated at the time the physical random number generator apparatus is manufactured, and may be stored in a nonvolatile memory device or the like. In step S12, the entropy-estimation-based control circuit 16 initializes a variable SUM to zero. In step S13, the entropy-estimation-based control circuit 16 receives an estimated minimum entropy Me from the minimum entropy supply circuit 15B-2. In step S14, the output circuit 23 sends n-bit physical random numbers to the entropy compressing apparatus 14. The entropy compressing apparatus 14 stores the received n-bit physical random numbers in a latch or the like to accumulate them together with the physical random numbers previously received. Namely, in the case in which n-bit physical random numbers are received m times, the physical random numbers obtained through these m receptions are put together and stored as physical random numbers of m×n bits in the latch or the like.

In step S15, the entropy-estimation-based control circuit 16 checks whether the estimated minimum entropy Me is smaller than the minimum entropy M. In the case of the check result being NO, the entropy-estimation-based control circuit 16 sends control information indicative of disposal to the entropy compressing apparatus 14 in step S16, thereby causing the entropy compressing apparatus 14 to dispose of the n-bit physical random numbers received this time. Thereafter, the procedure returns to step S13, and the subsequent steps are repeated. In the case of the check result being YES, the entropy-estimation-based control circuit 16 adds "1" to the variable SUM in step S17. In step S18, the entropy-estimation-based control circuit 16 checks whether the value of the variable SUM is smaller than the variable NUM obtained in step S1. If the check result indicates YES, the procedure goes back to step S13 to repeat the subsequent steps. If the check result indicates NO, the entropy-estimation-based control circuit 16 sends an input completion signal to the entropy compressing apparatus 14 in step S19.

In response to the input completion signal, the entropy compressing apparatus 14 performs an entropy compression process by using, as the input thereinto, all the bits of the physical random numbers received after step S12. Examples of the configuration and operations of the entropy compressing apparatus 14 will be described later in detail.

In the procedure described above, the occurrence of an event that the value of the estimated minimum entropy Me is smaller than the minimum entropy M obtained at the time of manufacture leads to a determination that a entropy drop has occurred, resulting in the disposal of the physical random numbers in hand as a safety measure. Compared with the operation illustrated in FIG. 5, the operation illustrated in FIG. 6 is inferior in terms of operating speed, but more reliably produces a physical random number sequence having an entropy value larger than or equal to EL.

Figure 7:
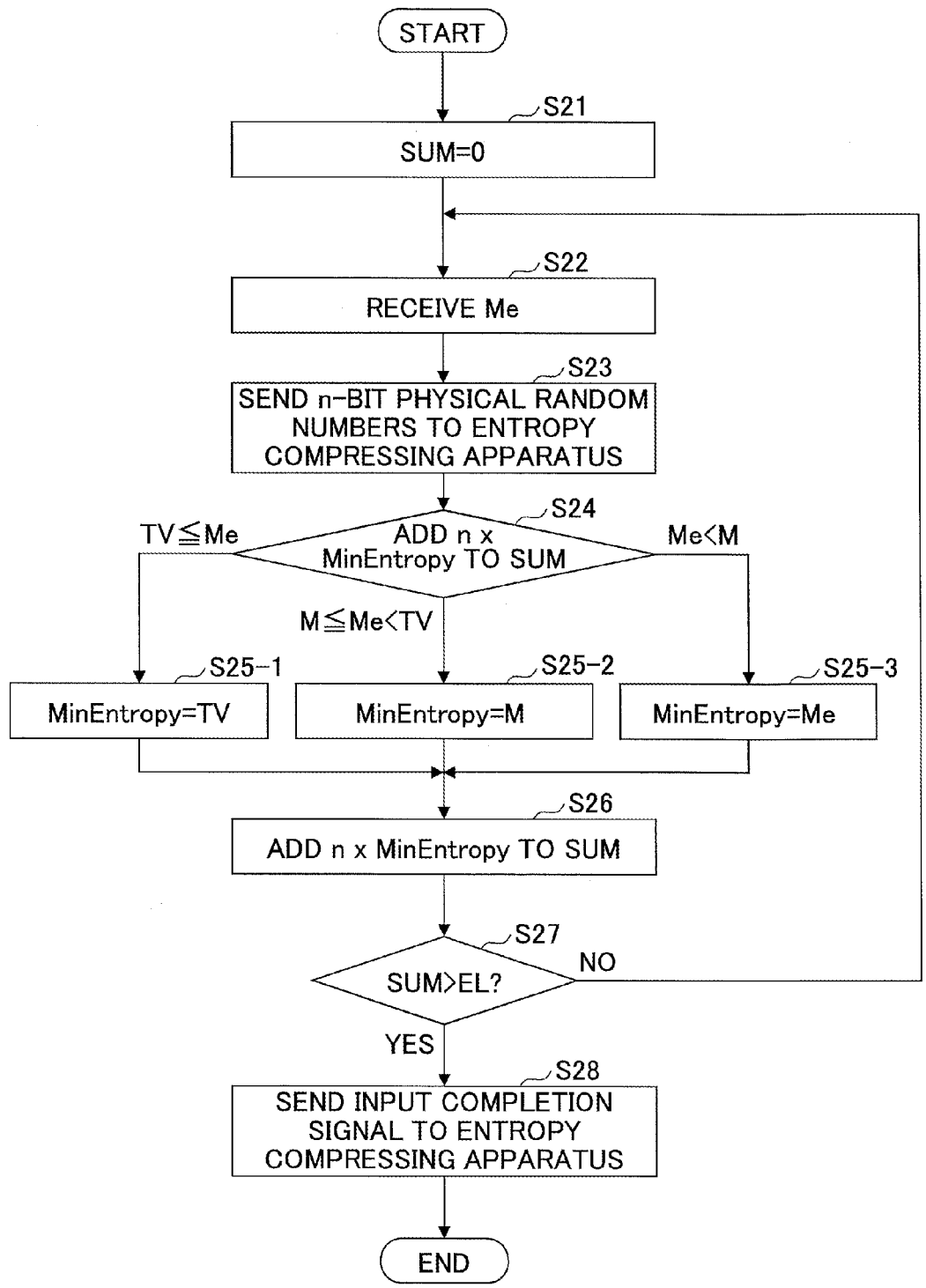
FIG. 7 is a flowchart illustrating yet another example of the operation of the entropy-estimation-based control circuit.

FIG. 7 is a flowchart illustrating yet another example of the operation of the entropy-estimation-based control circuit. In this procedure, a plurality of sets of random numbers are accumulated where one set is constituted by the predetermined number of bits (i.e., n bits) of physical random numbers. The entropy-estimation-based control circuit 16 uses the accumulated physical random numbers as an input into the entropy compression process when the sum of products between the predetermined number and a value responsive to the minimum entropy as added for the plurality of sets exceeds a predetermined threshold. Here, the value responsive to the minimum entropy refers to a value that is smaller than or equal to the minimum entropy.

In the following, a per-bit entropy required of a physical random number sequence output from the entropy compressing apparatus 14 is denoted as E, and the length of this physical random number sequence is denoted as L (bits). A per-bit minimum entropy generated by the physical random number generation circuit 10 is denoted as M, which is determined by testing the physical random number generator apparatus at the time of manufacture. Moreover, a sufficiently large entropy value TV is set in advance, which is determined at the time the physical random number generator apparatus is manufactured. TV is any value that is selected to satisfy the condition: M≤TV.

In step S21, the entropy-estimation-based control circuit 16 initializes a variable SUM to zero. In step S22, the entropy-estimation-based control circuit 16 receives an estimated minimum entropy Me from the minimum entropy supply circuit 15B-2. In step S23, the output circuit 23 sends n-bit physical random numbers to the entropy compressing apparatus 14. The entropy compressing apparatus 14 stores the received n-bit physical random numbers in a latch or the like to accumulate them together with the physical random numbers previously received. Namely, in the case in which n-bit physical random numbers are received m times, the physical random numbers obtained through these m receptions are put together and stored as physical random numbers of m×n bits in the latch or the like.

In step S24, the entropy-estimation-based control circuit 16 checks the magnitude relationship of the estimated minimum entropy Me relative to the minimum entropy M and the sufficiently large entropy value TV. In the case of Me being larger than or equal to TV, the entropy-estimation-based control circuit 16 sets the value of a variable MinEntropy equal to TV in step S25-1. In the case of Me being smaller than TV and larger than or equal to M, the entropy-estimation-based control circuit 16 sets the value of the variable MinEntropy equal to M in step S25-2. In the case of Me being smaller than M, the entropy-estimation-based control circuit 16 sets the value of the variable MinEntropy equal to Me in step S25-3. As described above, the value of Me is used as the value of the variable MinEntropy when the value of Me belongs to the lowest range, and the smallest value in a given range is used as the value of the variable MinEntropy when the value of Me belongs to the given range that is not the lowest range.

In step S26, the entropy-estimation-based control circuit 16 adds n×MinEntropy to the variable SUM. In step S27, the entropy-estimation-based control circuit 16 checks whether the value of the variable SUM is greater than E×L. If the check result indicates NO, the procedure goes back to step S22 to repeat the subsequent steps. If the check result indicates YES, the entropy-estimation-based control circuit 16 sends an input completion signal to the entropy compressing apparatus 14 in step S28.

In response to the input completion signal, the entropy compressing apparatus 14 performs an entropy compression process by using, as the input thereinto, all the bits of the physical random numbers received after step S21. Examples of the configuration and operations of the entropy compressing apparatus 14 will be described later in detail.

In the procedure described above, safety is a primary consideration. Since the estimated minimum entropy value is only an estimate, there is no guarantee that the obtained minimum entropy is the true minimum entropy. When it is desirable to produce a random number sequence having entropy larger than or equal to a predetermined value without fail, an entropy value that is set lower than the estimated minimum entropy with some margin may be used to perform a safety-conscious process.

In the case of TV≤Me, it is ascertained that the generated physical random numbers have a sufficiently large minimum entropy, but the minimum entropy is set equal to TV to be on the safe side. In this case, emphasis is placed on speed as well as on certainty. In the case of M≤Me<TV, it is ascertained that physical random numbers exceeding the minimum entropy M determined at the time of manufacture are generated, but the minimum entropy is set equal to M to avoid an estimation error and to ensure reliability. In this case, emphasis is placed on certainty. In the case of Me<M, it is ascertained that the minimum entropy M determined at the time of manufacture is not attained, and that an entropy drop is occurring. The minimum entropy is set equal to Me that is an estimate obtained from actual measurements at the time of operations. In this case, emphasis is placed on certainty.

In this manner, a value that is used as the minimum entropy (i.e., MinEntropy) is set in a stepwise manner to achieve a balance between safety and speed. As an imaginary example, the procedure in which the minimum entropy is set equal to M in the case of M≤Me may be used. In such a case, however, the minimum entropy is set equal to M even when Me is sufficiently large, resulting in low efficiency and slow entropy compression. Setting TV equal to a large value allows the minimum entropy to be set equal to TV when a sufficiently large Me is obtained, thereby inhibiting speed reduction in the entropy compression process. It may be noted that in the case of a sufficiently large Me being obtained, the minimum entropy may be set equal to Me upon finding TV≤Me in order to place more emphasis on speed than on certainty.

FIG. 8 is a drawing illustrating an example of a conversion table used in minimum entropy estimation. Namely, this conversion table is an example of the lookup table usable as the minimum entropy supply circuit 15B-2 in the physical random number generator apparatus illustrated in FIG. 4.

Minimum entropy values illustrated in FIG. 8 are obtained by calculating the formula illustrated in the minimum entropy supply circuit 15B-2 in FIG. 4 with respect to statistical values Cmax. The size of the lookup table is n/2, which is half the predetermined number n for which statistical information is obtained. In the case of the predetermined number n being 64, for example, either the number of occurrences of "1" or the number of occurrences of "0" in a 64-bit sequence, whichever is larger, is used as a statistical value Cmax, so that the value of a statistical value Cmax is always 32 or larger. As a table entry, thus, table elements corresponding to 0 through 31 are not necessary. As illustrated in FIG. 8, when random numbers are unduly imbalanced (i.e., when Cmax is larger than or equal to 60), the minimum entropy is estimated to be "0". In reality, such imbalanced physical numbers fail to pass the health test.

Figure 9:
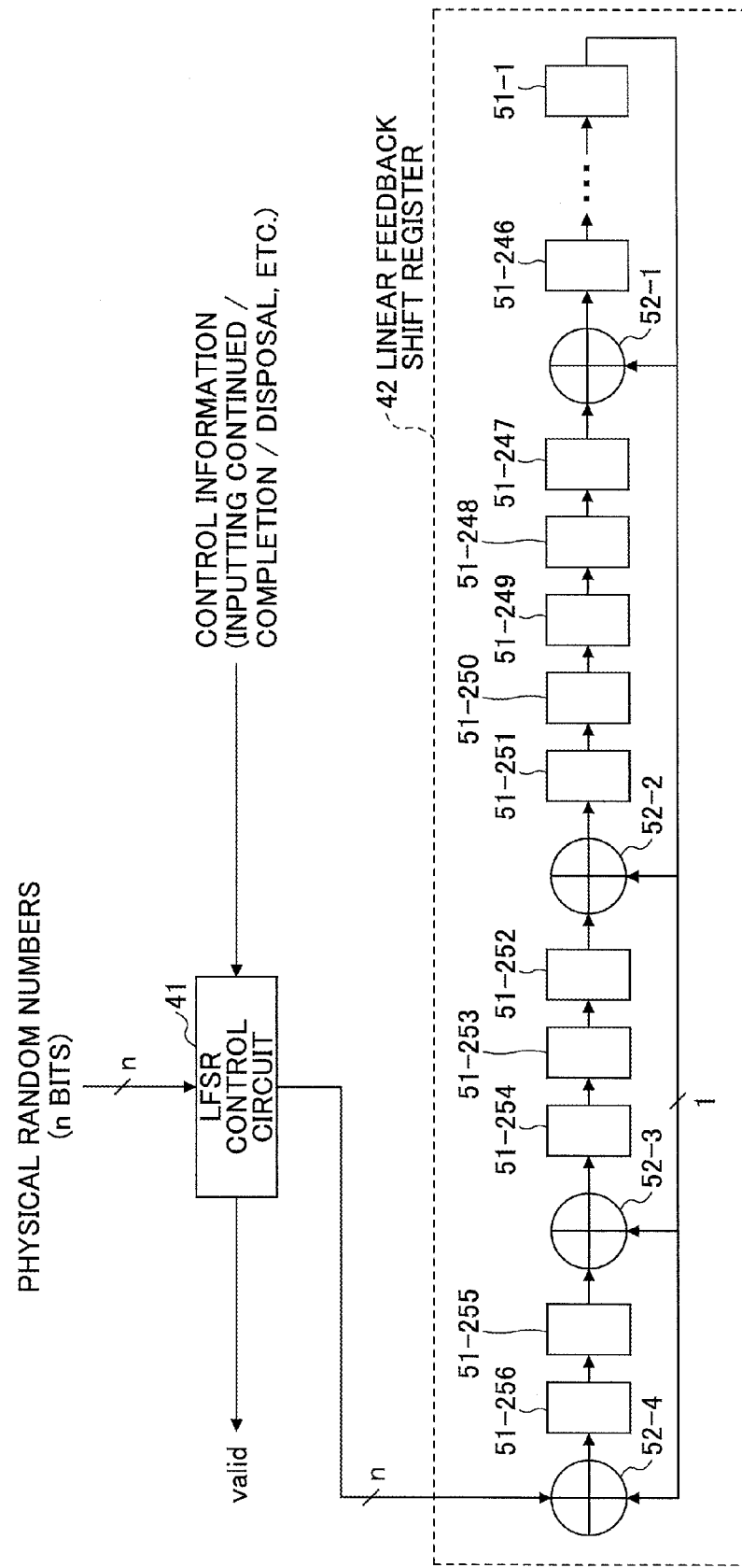
FIG. 9 is a drawing illustrating an example of the configuration of an entropy compressing apparatus.

FIG. 9 is a drawing illustrating an example of the configuration of an entropy compressing apparatus. The entropy compressing apparatus illustrated in FIG. 9 may be used as the entropy compressing apparatus 14 of the physical random number generator apparatus illustrated in FIG. 4.

The entropy compressing apparatus 14 illustrated in FIG. 9 includes an LFSR (linear feedback shift register) control circuit 41 and a linear feedback shift register 42. The linear feedback shift register 42 includes 256 flip-flops 51-1 through 51-256 and XOR gates 52-1 through 52-4. The flip-flops 51-1 through 51-256 are cascade-connected to constitute a 256-bit shift register.

Upon receiving n-bit physical random numbers from the register 11 through the output circuit 23, the entropy compressing apparatus 14 stores the received physical random numbers in an internal register of the LFSR control circuit 41. Upon receiving a control signal indicative of continued inputting from the entropy-estimation-based control circuit 16, the LFSR control circuit 41 supplies the n-bit physical random numbers stored in the internal register to the linear feedback shift register 42, thereby inputting them one bit after another into the 256-bit shift register. In order to input n-bit physical random numbers into the shift register, n clock pulses may be applied to each of the flip-flops 51-1 through 51-256 under the control of the LFSR control circuit 41.

Upon receiving a control signal indicative of disposal from the entropy-estimation-based control circuit 16, the LFSR control circuit 41 disposes of the n-bit physical random numbers stored in the internal register. In this case, the LFSR control circuit 41 may attend to a control procedure by which n clock pulses are not supplied to the linear feedback shift register 42. The LFSR control circuit may simply overwrite the physical random numbers to be discarded with n-bit subsequently received physical random numbers.

In this manner, the linear feedback shift register 42 of the entropy compressing apparatus 14 stores n-bit physical random numbers successively received without being discarded in the shift register, thereby accumulating them together with the previously received physical random numbers. Namely, in the case in which n-bit physical random numbers are received m times, the physical random numbers obtained through these m receptions are put together and stored as physical random numbers of m×n bits in the shift register.

The LFSR control circuit 41 asserts a valid signal indicative of a data valid state upon receiving a control signal indicative of input completion from the entropy-estimation-based control circuit 16. During the period in which the valid signal is in the asserted state, the LFSR control circuit 41 causes the 256-bit data stored in the shift register portion of the linear feedback shift register 42 to be output as entropy-compressed physical random numbers from the linear feedback shift register 42.

The entropy compressing apparatus may alternatively utilize another system different from the system using a linear feedback shift register, such as a system using a one-way function, a system using block encryption, etc. The configuration of the entropy compressing apparatus 14 illustrated in FIG. 1 or FIG. 4 is not limited to that of the entropy compressing apparatus illustrated in FIG. 9, and may be a configuration utilizing such a system as noted above.

FIG. 10 is a table illustrating an advantage regarding the processing speed of the entropy compressing apparatus illustrated in FIG. 4. For the purpose of calculating processing speed illustrated in this table, the minimum entropy M determined at the time of manufacture is 0.5 bit, and the entropy EL required of the entropy-compressed physical random numbers is 256 bits. Further, the fixed input length N of physical random numbers input into a related-art entropy compressing apparatus is 512 bits (=EL/M). Moreover, the circuit size of the physical random number generator apparatus is 1265.5 gates. In the physical random number generator apparatus illustrated in FIG. 4, the circuit size of the minimum entropy estimating circuit (excluding the statistical information acquisition circuit) is 100 gates, and the circuit size of the statistical information acquisition circuit of the health test circuit is 100 gates.

As illustrated in FIG. 10, the time length required for a related-art entropy compressing process is constant and equal to 512 cycles in the case of the per-bit entropy of physical random numbers at the runtime being 0.5 bit to 1.0 bit (such entropy will be referred to as a "runtime entropy"). The time length required for an entropy compression process in the physical random number generator apparatus illustrated in FIG. 4 is 520 cycles, 512 cycles, 348 cycles, and 260 cycles in the case of the runtime entropy being 0.5 bit, 0.508 bit, 0.75 bit, and 1.0 bit, respectively. In the table illustrated in FIG. 10, the time length required for an entropy compression process of the physical random number generator apparatus illustrated in FIG. 4 includes the time required for the process performed by the minimum entropy estimating circuit.

In the case of the runtime entropy being 0.5 bit, the related-art entropy compression process is completed in a shorter time, by a small margin, than the entropy compression process of the physical random number generator apparatus illustrated in FIG. 4. In this case, the runtime entropy in the related-art configuration coincides with the minimum entropy M, so that N is in agreement with the optimum input length. In the entropy compression process of the physical random number generator apparatus illustrated in FIG. 4, on the other hand, the end of the process is delayed by a time length equal to the processing time of the minimum entropy estimating circuit.

In the case of the runtime entropy being larger than 0.508 bit, however, the entropy compression process of the physical random number generator apparatus illustrated in FIG. 4 is faster than the related-art entropy compression process. In the case of the runtime entropy being 0.75 bit, the entropy compression process of the physical random number generator apparatus illustrated in FIG. 4 is 1.47 times faster than the related-art entropy compression process. In the case of the runtime entropy being 1.0 bit, which is an ideal value, the entropy compression process of the physical random number generator apparatus illustrated in FIG. 4 is 2.0 times faster than the related-art entropy compression process.

In the case of the runtime entropy being 0.25 bit, which is smaller than the minimum entropy M, the related-art entropy compression process ends up generating physical random numbers having an entropy of 128 bits, failing to satisfy a required entropy of 256 bits. On the other hand, the entropy compression process of the physical random number generator apparatus illustrated in FIG. 4 can generate a physical random number sequence satisfying a required entropy without fail, despite the fact that a long processing time is used.

Circuit size will be considered next. The case in which a portion of the health test circuit and a portion of the minimum entropy estimating circuit are consolidated for shared use (i.e., as in the case of the physical random number generator apparatus illustrated in FIG. 4) is compared with the case in which such shared use is not made. In the case of no shared use, a circuit having a size of 200 gates is added as a minimum entropy estimating circuit in order to perform a minimum entropy estimation process. In the case of shared use being made, the additional circuit used for minimum entropy estimation corresponds to a portion of the minimum entropy estimating circuit remaining after removing the statistical information acquisition circuit, and has a size of 100 gates.

Figure 11:
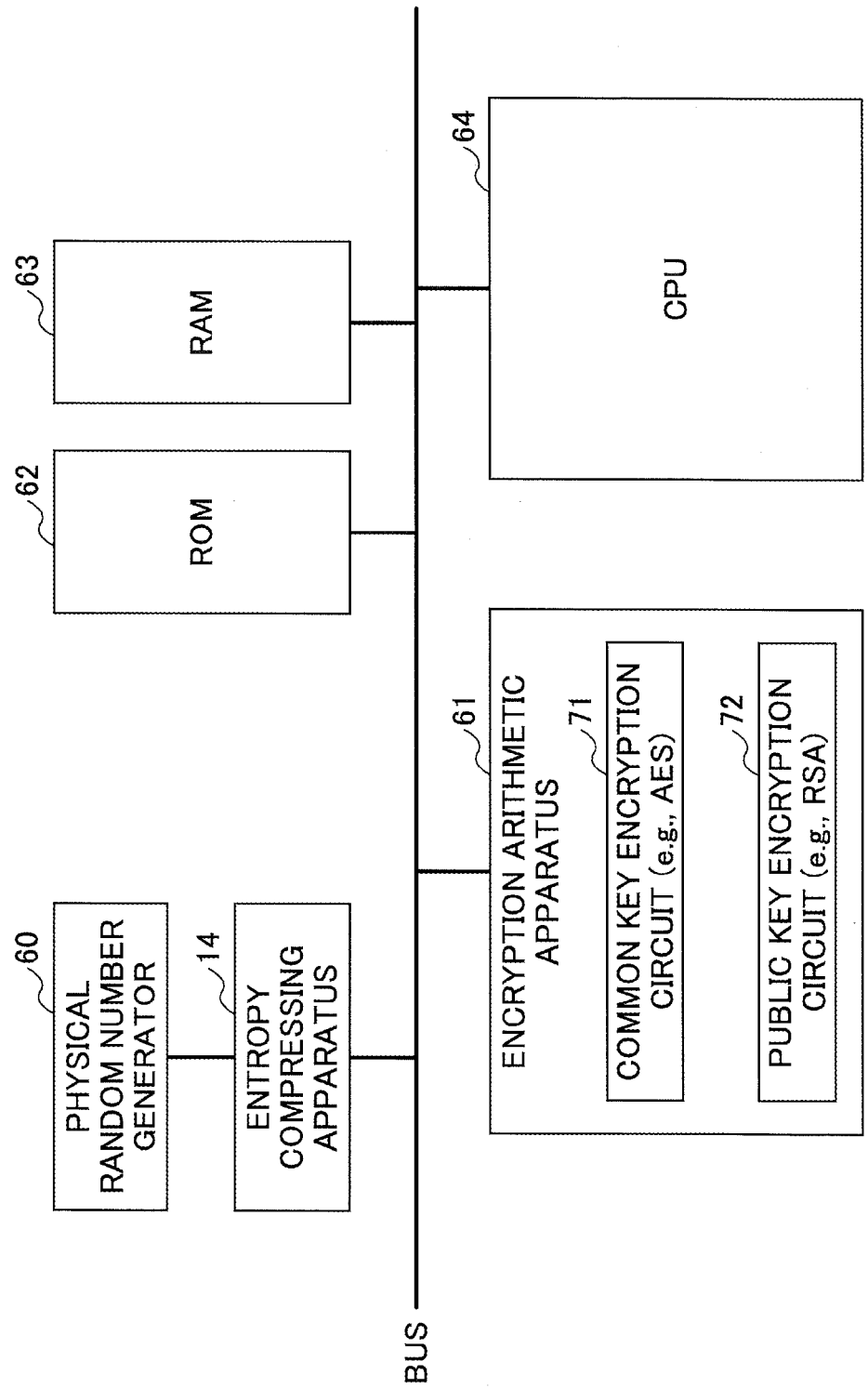
FIG. 11 is a drawing illustrating an example of the configuration of an encryption system.

FIG. 11 is a drawing illustrating an example of the configuration of an encryption system. The encryption system illustrated in FIG. 11 includes a physical random number generator 60, the entropy compressing apparatus 14, an encryption arithmetic apparatus 61, a ROM (read only memory) 62, a RAM (random access memory) 63, and a CPU (central processing unit) 64. The encryption arithmetic apparatus 61 includes a common key encryption circuit and a public key encryption circuit 72. The physical random number generator 60 corresponds to the remaining portion of the physical random number generator apparatus illustrated in FIG. 4 excluding the entropy compressing apparatus 14. Namely, the physical random number generator 60 and the entropy compressing apparatus 14 illustrated in FIG. 11 correspond to the physical random number generator apparatus illustrated in FIG. 4.

The CPU 64 operates based on data and programs stored in the ROM 62 and the RAM 63, so that a random number generation process and an encryption key generation process are performed under to the control of the CPU 64. Specifically, the physical random number generator 60 and the entropy compressing apparatus 14 generate entropy-compressed physical random numbers, which are supplied to the encryption arithmetic apparatus 61 through a bus. The encryption arithmetic apparatus 61 performs a key generation algorithm, so that the common key encryption circuit 71 and the public key encryption circuit 72 generate a common key (i.e., secret key) and a public key, respectively, based on the supplied physical random numbers.

According to at least one embodiment, proper entropy compression is performed even when the entropy of a random number sequence actually output from a physical random number generator has fluctuation.

Further, the present invention is not limited to these embodiments, but various variations and modifications may be made without departing from the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An apparatus that generates a physical random number sequence, comprising:
   a physical random number generator configured to generate physical random numbers;
   a test circuit configured to perform a test process to check randomness of the physical random numbers, the test process including counting a number of subsequent bits having the same value as a first bit in a predetermined number of bits of the physical random numbers, to output the counted number of subsequent bits as statistical information;
   a minimum entropy estimating circuit configured to estimate a minimum entropy based on the statistical information generated as a byproduct of the test process;
   an entropy compressing circuit configured to perform an entropy compression process using the physical random numbers as an input to produce the physical random number sequence; and
   an entropy control circuit configured to control based on the minimum entropy a number of bits of the physical random numbers input into the entropy compression process performed by the entropy compressing circuit,
   wherein a result of the test process indicating satisfactory randomness causes the physical random numbers generated by the physical random number generator to be retained and used in the entropy compression process, and a result of the test process failing to indicate satisfactory randomness causes the physical random numbers generated by the physical random number generator to be discarded and unused in the entropy compression process.

2. The apparatus as claimed in claim 1, wherein the minimum entropy estimating circuit includes a lookup table in which values responsive to the statistical information are associated with estimated values of the minimum entropy.

3. The apparatus as claimed in claim 1, wherein based on the physical random numbers whose quantity is controlled in terms of the number of input bits, the entropy compression process performed by the entropy compressing circuit produces a random number sequence constituted by a fixed number of bits regardless of how large the controlled number of input bits is.

4. The apparatus as claimed in claim 1, wherein the physical random numbers are accumulated as a plurality of sets each constituted by the predetermined number of bits of the physical random numbers, and the entropy control circuit uses the accumulated physical random numbers as an input into the entropy compression process when a sum of products between the predetermined number and the minimum entropy as added for the plurality of sets exceeds a predetermined entropy value.

5. The apparatus as claimed in claim 1, wherein the physical random numbers are accumulated as a plurality of sets, each of which is constituted by the predetermined number of bits of the physical random numbers, and each of which has the minimum entropy larger than or equal to a predetermined value, and the entropy control circuit uses the accumulated physical random numbers as an input into the entropy compression process when a number of the accumulated sets exceeds a predetermined number.

6. The apparatus as claimed in claim 1, wherein the physical random numbers are accumulated as a plurality of sets each constituted by the predetermined number of bits of the physical random numbers, and the entropy control circuit uses the accumulated physical random numbers as an input into the entropy compression process when a sum of products between the predetermined number and a value responsive to the minimum entropy as added for the plurality of sets exceeds a predetermined threshold, the value responsive to the minimum entropy being smaller than or equal to the minimum entropy.

7. A method for generating a physical random number sequence, comprising:
   generating, by a physical random number generator, physical random numbers;
   performing, by a test circuit, a test process to check randomness of the physical random numbers, the test process including counting a number of subsequent bits having the same value as a first bit in a predetermined number of bits of the physical random numbers, to output the counted number of subsequent bits as statistical information;
   estimating, by a minimum entropy estimating circuit, a minimum entropy based on the statistical information generated as a byproduct of the test process;
   accumulating, in a register, the physical random numbers as many bits as a number determined based on the minimum entropy; and
   performing, by an entropy compressing circuit, an entropy compression process using the accumulated physical random numbers as an input to produce the physical random number sequence; and
   controlling, by an entropy control circuit, based on the minimum entropy, a number of bits of the physical random numbers input into the entropy compression process,
   wherein a result of the test process indicating satisfactory randomness causes the physical random numbers to be retained and used in the entropy compression process, and a result of the test process failing to indicate satisfactory randomness causes the physical random numbers to be discarded and unused in the entropy compression process.

8. A system that generates a physical random number sequence, comprising:
   a processor;
   a memory;
   an encryption arithmetic apparatus; and
   a physical random number generator apparatus,
   wherein the physical random number generator apparatus includes:
   a physical random number generator configured to generate physical random numbers;
   a test circuit configured to perform a test process to check randomness of the physical random numbers, the test process including counting a number of subsequent bits having the same value as a first bit in a predetermined number of bits of the physical random numbers, to output the counted number of subsequent bits as statistical information;

a minimum entropy estimating circuit configured to estimate a minimum entropy based on the statistical information generated as a byproduct of the test process;

an entropy compressing circuit configured to perform an entropy compression process using the physical random numbers as an input to produce the physical random number sequence; and an entropy control circuit configured to control based on the minimum entropy a number of bits of the physical random numbers input into the entropy compression process performed by the entropy compressing circuit, wherein a result of the test process indicating satisfactory randomness causes the physical random numbers generated by the physical random number generator to be retained and used in the entropy compression process, and a result of the test process failing to indicate satisfactory randomness causes the physical random numbers generated by the physical random number generator to be discarded and unused in the entropy compression process.

* * * * *